United States Patent
Chen

(10) Patent No.: US 7,163,366 B2
(45) Date of Patent: Jan. 16, 2007

(54) SCREW WITH TWO TYPES OF THREADS

(76) Inventor: Pei-Hua Chen, No. 35, Lane 193, Gangshan N. Rd., Gangshan Township, Kaohsiung County (TW) 820

(*) Notice: Subject to any disclaimer, the term of this patent is extended or adjusted under 35 U.S.C. 154(b) by 0 days.

(21) Appl. No.: 11/028,637

(22) Filed: Jan. 5, 2005

(65) Prior Publication Data

US 2006/0147295 A1    Jul. 6, 2006

(51) Int. Cl.
*F16B 35/04* (2006.01)
(52) U.S. Cl. ..................... 411/417; 411/411
(58) Field of Classification Search ............ 411/411, 411/412, 417, 387.1–387.8, 309, 310, 311; 144/223; 83/875, 699.21
See application file for complete search history.

(56) References Cited

U.S. PATENT DOCUMENTS

| | | | | |
|---|---|---|---|---|
| 113,557 A | * | 4/1871 | Pearson | 411/272 |
| 2,301,181 A | * | 11/1942 | Ilsemann | 411/309 |
| 2,484,644 A | * | 10/1949 | Poupitch | 411/311 |
| 2,637,355 A | * | 5/1953 | Chapin | 83/850 |
| 2,869,224 A | * | 1/1959 | Forster | 29/240.5 |
| 3,083,609 A | * | 4/1963 | Lovisek | 411/386 |
| 3,133,578 A | * | 5/1964 | Moskovitz | 411/309 |
| 3,238,836 A | * | 3/1966 | Johnson | 411/387.4 |
| 3,339,389 A | * | 9/1967 | Mosow | 72/88 |
| 3,426,820 A | * | 2/1969 | Phipard, Jr. | 411/310 |
| 3,643,543 A | * | 2/1972 | Gutshall | 411/418 |
| 3,661,194 A | * | 5/1972 | Macfarlane et al. | 411/311 |
| 3,937,119 A | * | 2/1976 | Ernst | 411/422 |
| 3,972,359 A | * | 8/1976 | Thomas | 411/308 |
| 3,972,360 A | * | 8/1976 | Cadwallader | 411/310 |
| 3,982,575 A | * | 9/1976 | Ollis et al. | 411/310 |
| 4,161,132 A | * | 7/1979 | Eklund et al. | 411/417 |
| 4,273,175 A | * | 6/1981 | Capuano | 411/168 |
| 4,411,147 A | * | 10/1983 | Capuano | 72/220 |
| 4,557,172 A | * | 12/1985 | Yoneda | 83/848 |
| 4,641,562 A | * | 2/1987 | Clarke | 83/837 |
| 4,727,788 A | * | 3/1988 | Yoshida et al. | 83/848 |
| 4,813,324 A | * | 3/1989 | Yoshida et al. | 83/848 |
| 4,827,822 A | * | 5/1989 | Yoshida et al. | 83/835 |
| 4,842,467 A | * | 6/1989 | Armstrong | 411/399 |
| 5,044,853 A | * | 9/1991 | Dicke | 411/311 |
| 5,088,869 A | * | 2/1992 | Greenslade | 411/386 |
| 5,110,245 A | * | 5/1992 | Hiroyuki | 411/421 |
| 5,133,630 A | * | 7/1992 | Hughes | 411/82.5 |
| 5,331,876 A | * | 7/1994 | Hayden, Sr. | 83/661 |
| 5,340,254 A | * | 8/1994 | Hertel et al. | 411/311 |
| 5,410,935 A | * | 5/1995 | Holston et al. | 83/851 |
| 5,570,983 A | * | 11/1996 | Hollander | 411/386 |
| 5,827,030 A | * | 10/1998 | Dicke | 411/387.4 |
| 5,897,280 A | * | 4/1999 | Dicke | 411/411 |
| 6,056,491 A | * | 5/2000 | Hsu | 411/418 |
| 6,079,921 A | * | 6/2000 | Gauthier et al. | 411/110 |

(Continued)

*Primary Examiner*—Katherine Mitchell
*Assistant Examiner*—Jeffrey A. Sharp
(74) *Attorney, Agent, or Firm*—Rosenberg, Klein & Lee

(57) ABSTRACT

A screw includes a first thread on the shank and located close to the point of the shank, and a second thread which is connected to the first thread and extends toward the head of the screw. Each of the first and second threads includes an upper flank and a lower flank. A first angle is defined by an intersection of the upper flank and the lower flank of the first thread, and is larger than a second angle defined by an intersection of the upper flank and the lower flank of the second thread. The first thread bears larger torque and the second thread includes sharper cutting edges.

8 Claims, 5 Drawing Sheets

U.S. PATENT DOCUMENTS

| | | | | |
|---|---|---|---|---|
| 6,086,302 | A * | 7/2000 | Gerhard | 411/387.4 |
| 6,135,689 | A * | 10/2000 | Matsunami | 411/311 |
| 6,152,666 | A * | 11/2000 | Walther et al. | 411/311 |
| 6,158,938 | A * | 12/2000 | Savoji | 411/386 |
| 6,254,327 | B1 * | 7/2001 | Chen | 411/411 |
| 6,332,741 | B1 * | 12/2001 | Janusz | 411/412 |
| 6,450,748 | B1 * | 9/2002 | Hsu | 411/387.4 |
| 6,464,439 | B1 * | 10/2002 | Janitzki | 411/308 |
| 6,520,722 | B1 * | 2/2003 | Hopper et al. | 407/42 |
| 6,598,509 | B1 * | 7/2003 | Cook et al. | 83/835 |
| 6,698,987 | B1 * | 3/2004 | Dicke | 411/387.6 |
| 6,764,263 | B1 * | 7/2004 | Carlo | 411/386 |
| 6,926,484 | B1 * | 8/2005 | Kram et al. | 411/311 |
| 2001/0007629 | A1 * | 7/2001 | Carlo | 411/387.4 |
| 2002/0127084 | A1 * | 9/2002 | Hsu | 411/387.4 |
| 2003/0031528 | A1 * | 2/2003 | Kram et al. | 411/311 |
| 2004/0028499 | A1 * | 2/2004 | Levey et al. | 411/112 |
| 2004/0081535 | A1 * | 4/2004 | Birkelbach et al. | 411/411 |
| 2004/0101381 | A1 * | 5/2004 | Kram et al. | 411/311 |
| 2004/0184897 | A1 * | 9/2004 | Levey et al. | 411/411 |
| 2005/0186048 | A1 * | 8/2005 | Dicke | 411/387.4 |

* cited by examiner

SCREW WITH TWO TYPES OF THREADS

FIELD OF THE INVENTION

The present invention relates to a screw having two different types of threads on the shank and the thread close to the point bear larger torque when cutting into objects.

BACKGROUND OF THE INVENTION

A conventional screw 1 is disclosed in FIG. 1 and generally includes a head 11 with a shank 12 connected there to which has threads 13 defined in an outer surface thereof. The thread includes several recesses 131 and a cutting edge 132 is formed between the adjacent recesses 131. When the screw 1 is threaded into an object 10, the cutting edges 132 of the threads 13 cut the fibers of the object such that the screw 1 can be easily merged into the object 10. It is noted that the threads 13 with smaller angle defined by the upper flank and the lower flank of the threads has sharper cutting edges so as to cut the fibers easily. Nevertheless, such threads cannot bear larger torque and could be damaged by larger torque. If the threads includes larger angle between the upper flank and the lower flank, the threads can bear larger torque but has less cutting feature. This makes the user to apply more force to drive the screw 1 into the deeper position of the object 10.

The present invention intends to provide a screw that includes two types of threads and the thread close to the point bear larger torque so as to be threaded into the object at the first stage without damaging the thread, and the other thread includes sharper cutting edges which make the screw easily to be sent into the object.

SUMMARY OF THE INVENTION

The present invention relates to a screw that comprises a head and a shank is connected to the head. The shank has a first thread and a second thread defined in an outer periphery of the shank. The first thread is on the first threaded section which including a point of the shank and the second thread is on the second threaded section. Each of the first and second threads are spirally connected to the outer periphery of the shank and includes an upper flank and a lower flank. A first angle is defined by an intersection of the upper flank and the lower flank of the first thread, and a second angle is defined by an intersection of the upper flank and the lower flank of the second thread. The first angle is larger than the second angle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
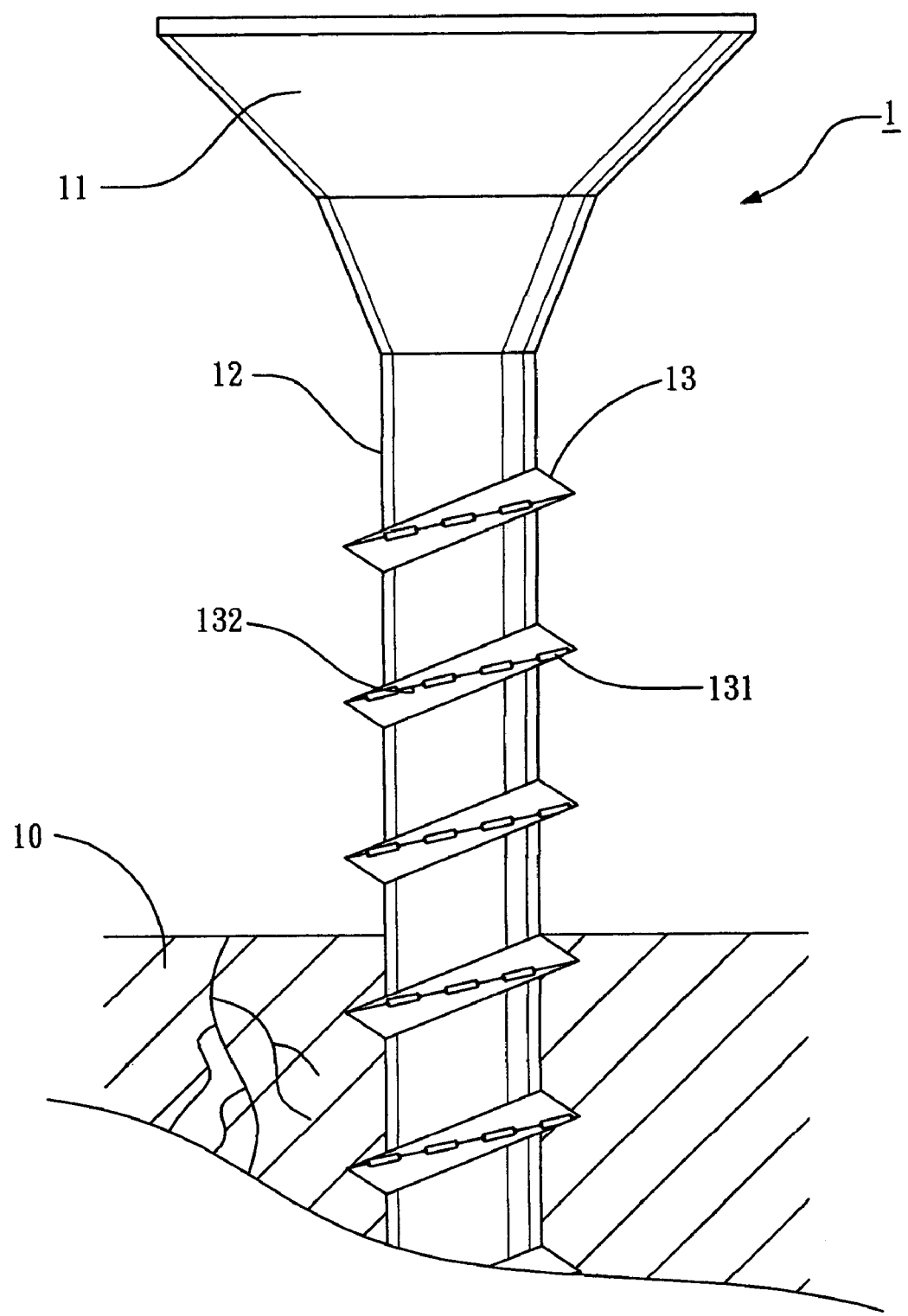
FIG. 1 shows a conventional screw threaded into an object.
Figure 2:
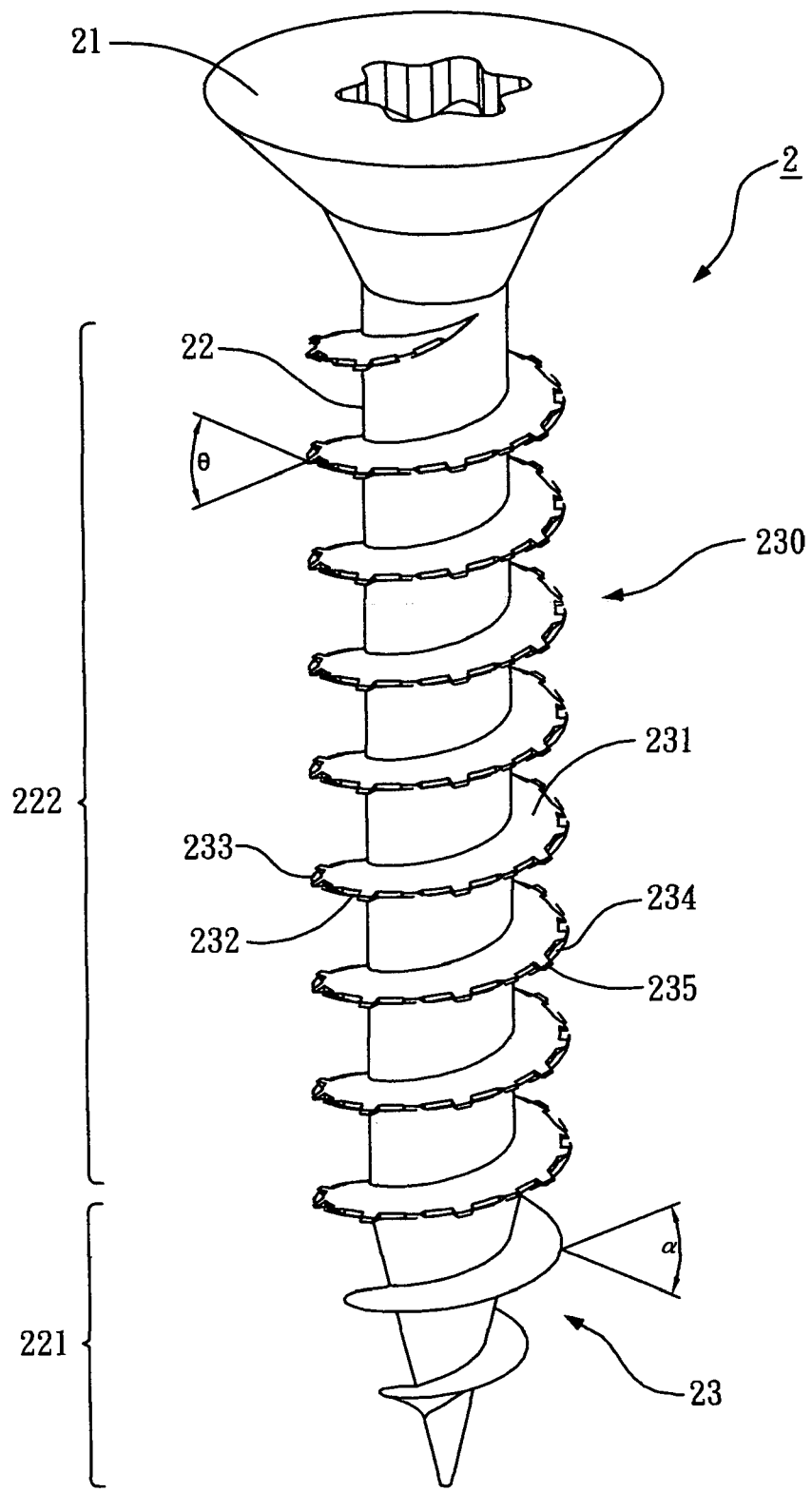
FIG. 2 shows the screw of the present invention.
Figure 3:
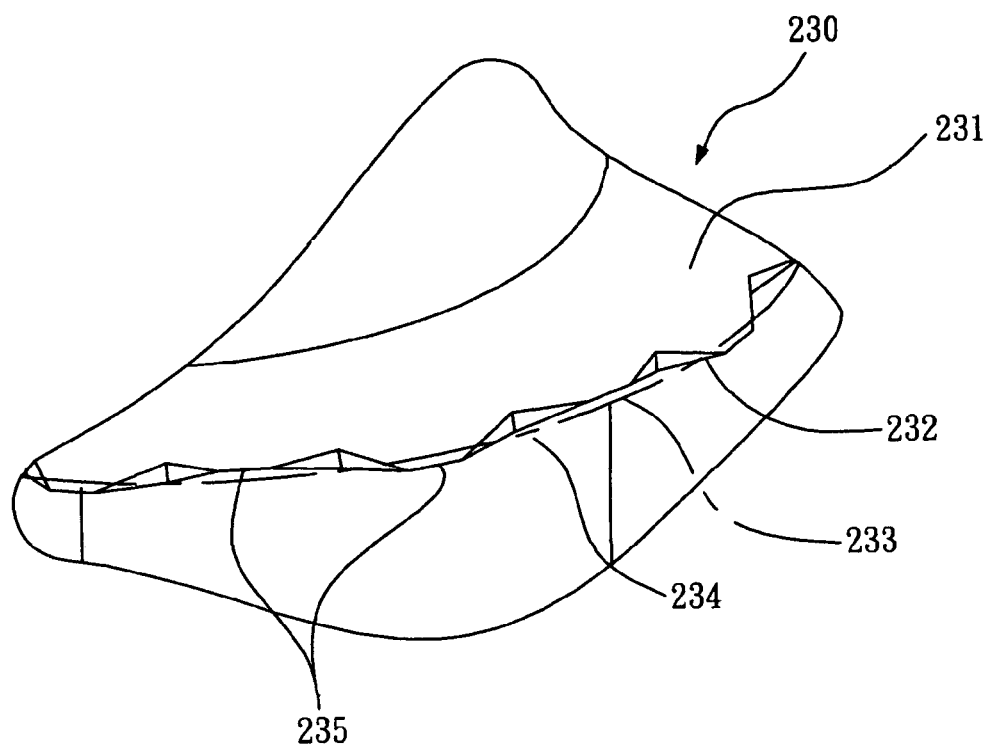
FIG. 3 shows a first embodiment of the threads of the screw of the present invention.

Referring to FIGS. 2 to 3, the screw 2 of the present invention comprises a head 21 and a shank 22 connected to the head 21. The shank 22 includes a first threaded section 221 which includes a point of the shank 22 and a second threaded section 222 which is located between the head 21 and the first threaded section 221. A first thread 23 and a second thread 230 are respectively defined in an outer periphery of the first and second threaded sections 221, 222 of the shank 22. Each of the first and second threads 23, 230 are spirally connected to the outer periphery of the shank 22 and includes an upper flank 231 and a lower flank 232. A first angle $\alpha$ is defined by an intersection of the upper flank 231 and the lower flank 232 of the first thread 23, and a second angle $\theta$ is defined by an intersection of the upper flank 231 and the lower flank 232 of the second thread 230. The first angle $\alpha$ is larger than the second angle $\theta$. This means that the first thread 23 bears a larger torque than the second thread 230.

Figure 4:
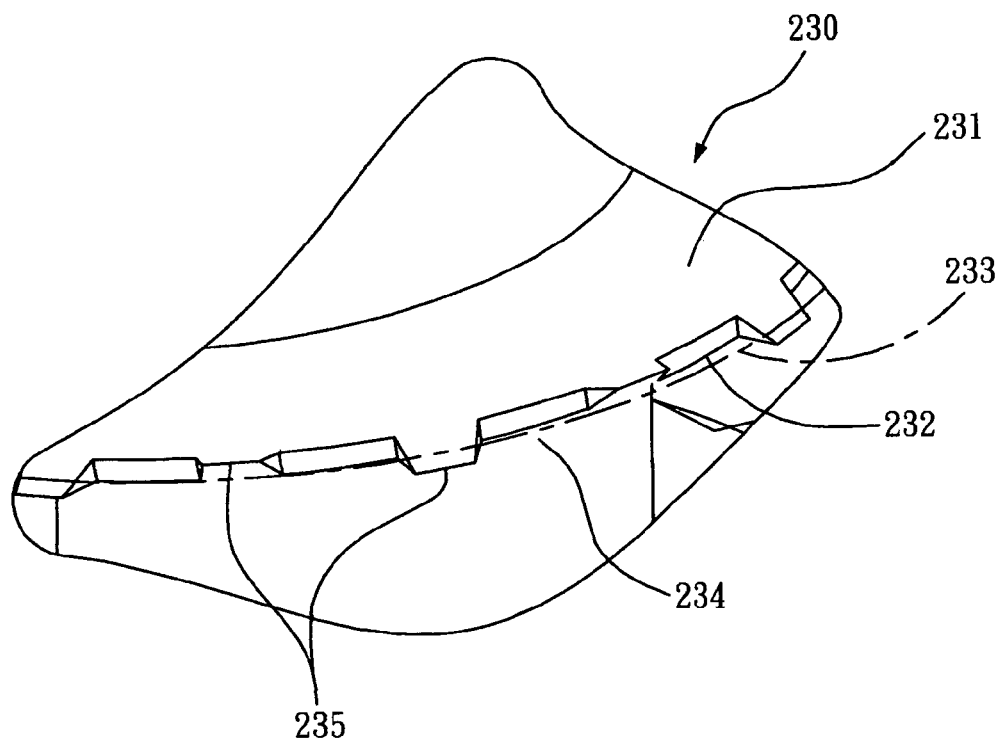
FIG. 4 shows a second embodiment of the threads of the screw of the present invention.
Figure 7:
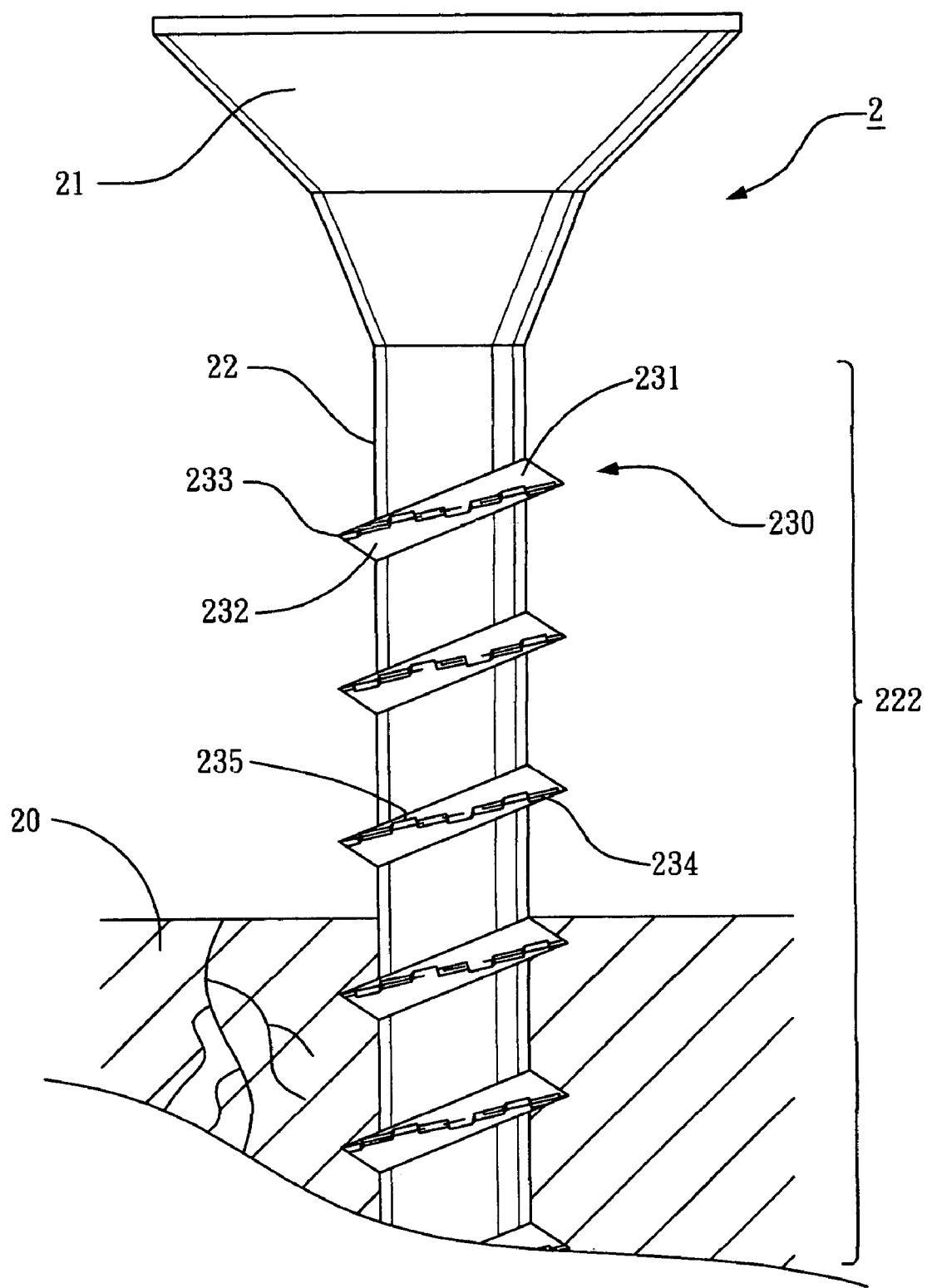
FIG. 7 shows the screw of the present invention is threaded into an object.

The second thread 230 includes a plurality of recesses 234 defined therein and a cutting edge 235 is defined between two adjacent recesses 234. The cutting edges 235 are located symmetrically about a thread crest 233 of the second thread 230. The cutting edges 235 perform as a saw to efficiently cut the fibers of the object 20 (see FIG. 7) that the screw 2 is to be threaded into. The recesses 234 are V-shaped recesses. The shape of the recesses 234 can also be rectangular as shown in FIG. 4.

Figure 5:
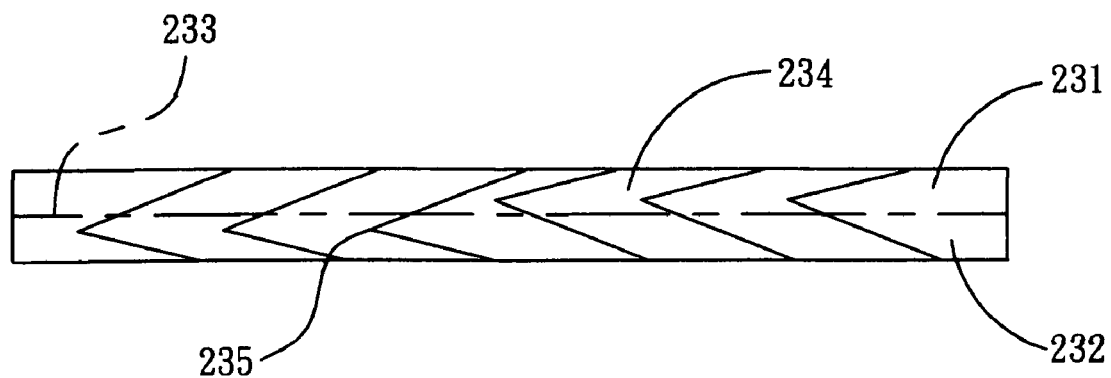
FIG. 5 is a side view to show a third embodiment of the threads of the screw of the present invention.
Figure 6:
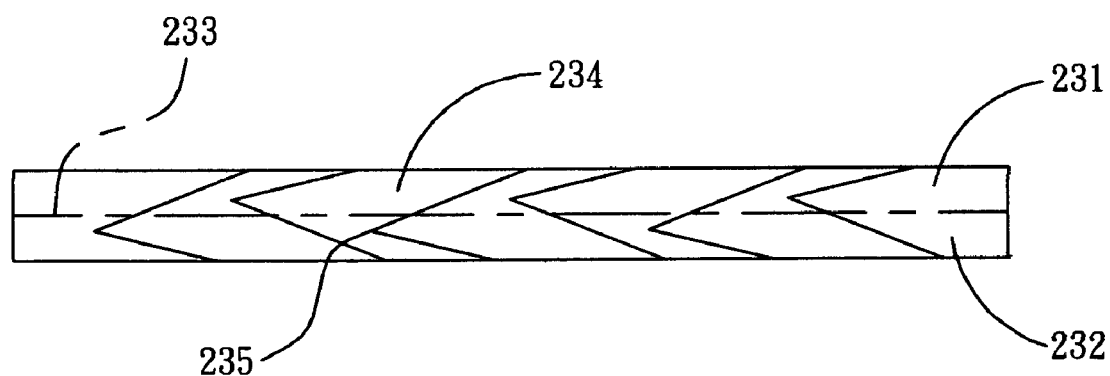
FIG. 6 is a side view to show a fourth embodiment of the threads of the screw of the present invention.

As shown in FIG. 5, the cutting edges 235 can be grouped and sequenced by three consecutive cutting edges 235 located above the thread crest 233 and the next three consecutive cutting edges 235 located below the thread crest 233. FIG. 6 shows that the cutting edges 235 can be arranged as shown.

In the screw 2 of the present invention, the first thread 23 can overcome the resistance at the first stage of threading into the object 20 without damaging the first thread 23, and then the second thread 230 with sharper cutting edges 235 cuts the fiber of the object 20 to easily and quickly thread the screw 2 into the object 20.

While we have shown and described the embodiment in accordance with the present invention, it should be clear to those skilled in the art that further embodiments may be made without departing from the scope of the present invention.

What is claimed is:

1. A screw comprising:

a head and a shank connected to the head, the shank having a first threaded section including a point of the shank and a second threaded section located between the head and the first threaded section, the first threaded section having a first thread and the second threaded section having a second thread, each of the first and second threads being spirally connected to the outer periphery of the shank and including an upper flank and a lower flank, a first angle being defined by an intersection of the upper flank and the lower flank of the first thread, a second angle being defined by an intersection of the upper flank and the lower flank of the second thread, the first angle being larger than the second angle; said first thread of said first threaded section having substantially smooth unpatterned said upper and lower flanks thereof and further having a continuously extending unpatterned cutting edge defined at and coinciding with said intersection of said upper and lower flanks of said first thread; and a thread crest defining a plurality of cutting edges circumferentially spaced each from the other by a respective plurality of recesses, said thread crest defining a helically directed envelope contour extending along an outer periphery of the second thread of the second threaded section, wherein consecutively spaced said cutting edges are located respectively on opposing sides upwardly, downwardly, inwardly, and outwardly of said helically directed envelope contour.

2. The screw as claimed in claim 1, wherein the recesses are V-shaped recesses.

3. The screw as claimed in claim 1, wherein the recesses are rectangular recesses.

4. The screw as claimed in claim 1, wherein the cutting edges are located symmetrically about the thread crest of the second thread.

5. A screw comprising:

a head and a shank connected to the head, the shank having a first threaded section including a point of the shank and a second threaded section located between the head and the first threaded section, the first threaded section having a first thread and the second threaded section having a second thread, each of the first and second threads being spirally connected to the outer periphery of the shank and including an upper flank and a lower flank, a first angle being defined by an intersection of the upper flank and the lower flank of the first thread, a second angle being defined by an intersection of the upper flank and the lower flank of the second thread, the first angle being larger than the second angle; said first thread of said first threaded section having substantially smooth unpatterned said upper and lower flanks thereof and further having a continuously extending unpatterned cutting edge defined at and coinciding with said intersection of said upper and lower flanks of said first thread; and a thread crest defining a plurality of first and second cutting edges, each of said first cutting edges being circumferentially displaced from a respective one of said plurality of second cutting edges by a respective one of a plurality of recesses, said thread crest defining a helically directed envelope contour extending along an outer periphery of the second thread of the second threaded section, wherein said plurality of first and second cutting edges are located on opposing sides upwardly, downwardly, inwardly, and outwardly of said helically directed envelope contour.

6. The screw as claimed in claim 5, wherein the recesses are V-shaped recesses.

7. The screw as claimed in claim 5, wherein the recesses are rectangular recesses.

8. The screw as claimed in claim 5, wherein the cutting edges are located symmetrically about the thread crest of the second thread.

* * * * *